Sept. 1, 1931.  A. E. OSWALD  1,821,071
ELECTRIC MOTOR
Original Filed Sept. 12, 1925  3 Sheets-Sheet 1

Inventor:
Alfred E Oswald
By B.C. Stickney
Attorney.

Sept. 1, 1931. A. E. OSWALD 1,821,071
ELECTRIC MOTOR
Original Filed Sept. 12, 1925   3 Sheets-Sheet 2

Sept. 1, 1931.  A. E. OSWALD  1,821,071
ELECTRIC MOTOR
Original Filed Sept. 12, 1925  3 Sheets-Sheet 3
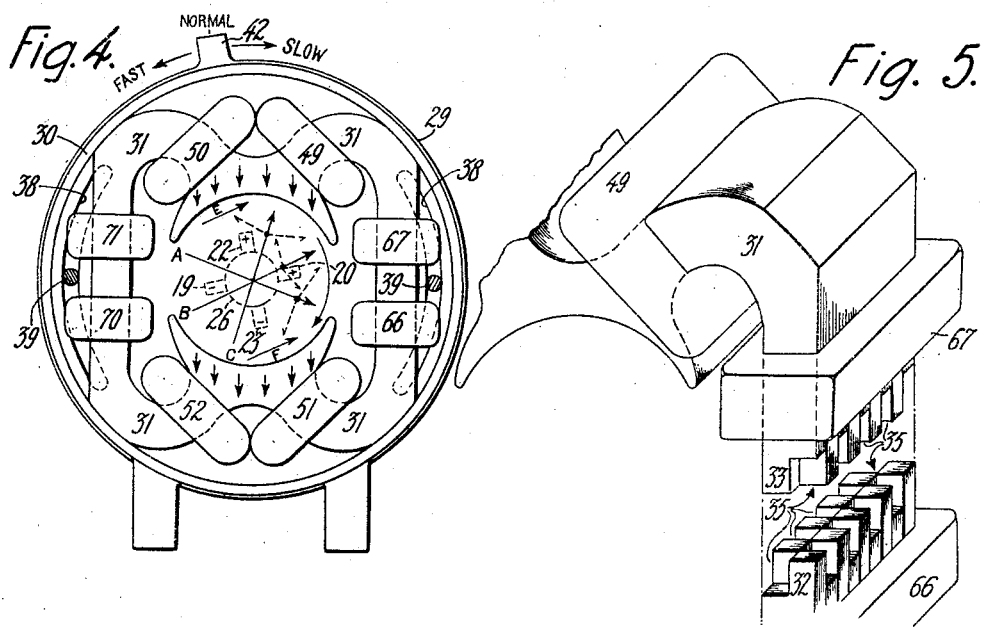
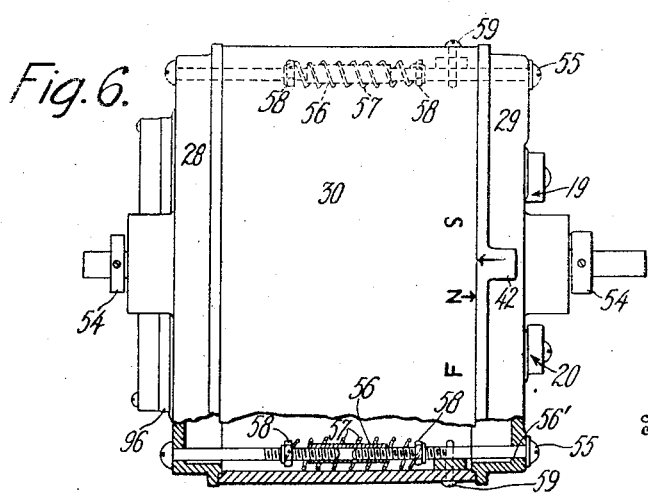
Inventor:
Alfred E Oswald
By D C Stickney
Attorney.

Patented Sept. 1, 1931

1,821,071

UNITED STATES PATENT OFFICE

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE

ELECTRIC MOTOR

Original application filed September 12, 1925, Serial No. 55,943. Divided and this application filed January 25, 1927. Serial No. 163,516.

This invention relates to electric motors and the primary object is to adapt a motor for work under a wide variety of conditions and on both direct and alternating current, thus substantially increasing its range of usefulness.

The motor has main and auxiliary field coils, each provided with terminals whereby connections are made in order that the motor may be adapted to a particular current, but an especially notable feature is that a main pair and an auxiliary pair of brushes are provided, each brush having a terminal. The coils and brushes are variously connectible by means of contact plates co-operating with the coil terminals and the brush terminals. The connectibility of the coils and brushes makes it possible for the motor to be used over a wide range and on currents of widely diversified nature.

The brushes are mounted for simultaneous movement for increasing or decreasing the speed of the motor, depending on the direction in which the brushes are moved. This gives the motor a two-fold advantage inasmuch as in operating a particular machine, it may be desired to change the speed of the motor, and further, because in the selling of motors, it makes it possible to meet a demand for motors of different speeds with a relatively small stock of motors, each motor possessing within itself an aptitude for operation at different speeds.

For operation on direct current, the coils are connected after the manner of a short shunt compound-wound motor, but with the important distinction that certain of the main field coils are connected to an auxiliary brush and a main brush. These latter coils receive a fraction of the armature voltage which is greatest across the main brushes. This scheme results in a greater range between high and low speed, because it is possible to weaken or strengthen the field magnet by this method of connection. When the brushes are moved in the direction opposite to that of armature rotation, the speed of the motor increases on a well known principle, but a new principle is also involved. As stated, certain of the field coils are connected to a main brush and an auxiliary brush. On the aforementioned shifting of the brushes, the voltage drop between the main brush and the auxiliary brush, to which the coils are connected, decreases, thus giving a weaker field and causing the motor to run faster.

The several field-coils are pre-wound, and an important feature of the invention resides in the manner of joining separable U-shaped laminated half-core portions, over the arms of which the pre-wound coils are threaded. Each U-shaped lamination has at the end of each of its arms an extension or finger formed by, and therefore adjoining, a jog. The fingers thus formed are on the same side of their respective arms, so that, by simply reversing one lamination with respect to the other, both laminations being alike, the fingers of one lamination fit into the jogs of the other lamination. The uniform U-shaped laminations of the built-up half-core portions are also alternatingly reversed, so that, by reason of said jogs, there are formed at the end of each arm of the built-up half-core portion two adjoining rows of staggered fingers, the fingers of each row being interspaced with the jogs forming the fingers of the other row. The fingers thus arranged in each half-core portion may be interdigitated with the fingers of the similarly built-up other half-core portion, to interlock the core-portions and form a good magnetic bond. Moreover, the fingers of the individual laminations may easily be seen as the two half-portions are brought together, and any misalignment of said fingers of the individual laminations, which would prevent bringing the core-portions fully together, may therefore be easily perceived and corrected as will be shown.

The combination of the two principles for changing the speed of the motor, gives a particularly wide range of speed power and also eliminates sparking at the commutator and brushes.

On alternating current, the invention contemplates the selective use of coils in combination with the main and auxiliary brushes. More power is produced by the motor. The provision of auxiliary brushes prevents the armature from unduly limiting the amount of current used. The principle of putting current through the main brushes from the line circuit is still used, but the auxiliary brushes are also used to take off currents induced in the armature. By permitting the consumption of more current, the auxiliary brushes give the motor greater power. The shifting of the brushes in the direction of armature rotation, retards the motor both by reason of the old principle, that the shift of the main brushes effects such result, and also by reason of an additional principle; namely, that the voltage induced at the auxiliary brushes is altered by reason of the shift of the armature turns relatively to the lines of the field magnetic force. The relationship is such that as the speed increases, the power also increases. This is an advance in the art of alternating current motors.

Heretofore, brushes have been moved with the object, primarily, of eliminating sparking. When shifting of the brushes has been used to change speed, they have been moved by a rocker-arm, and not by a complete end-bearing or head, as in this invention.

This application is a division of my application Serial No. 55,943, filed September 12, 1925, Patent No. 1,750,122, dated March 11, 1930.

Other features and advantages will hereinafter appear.

In the accompanying drawings,

Figure 4 is a cross-sectional view of the motor shown in Figure 1, and illustrating by arrows the direction of field magnetic force, armature magnetism and armature rotation.

Figure 5 is a fragmentary perspective view of parts of the field magnet showing coils on a portion of the magnet and illustrating the manner of assembling of laminations.

Figure 6 is a plan view with parts broken away and parts in section of a modified form of device for securing a head for limited angular movement.

Figure 1:
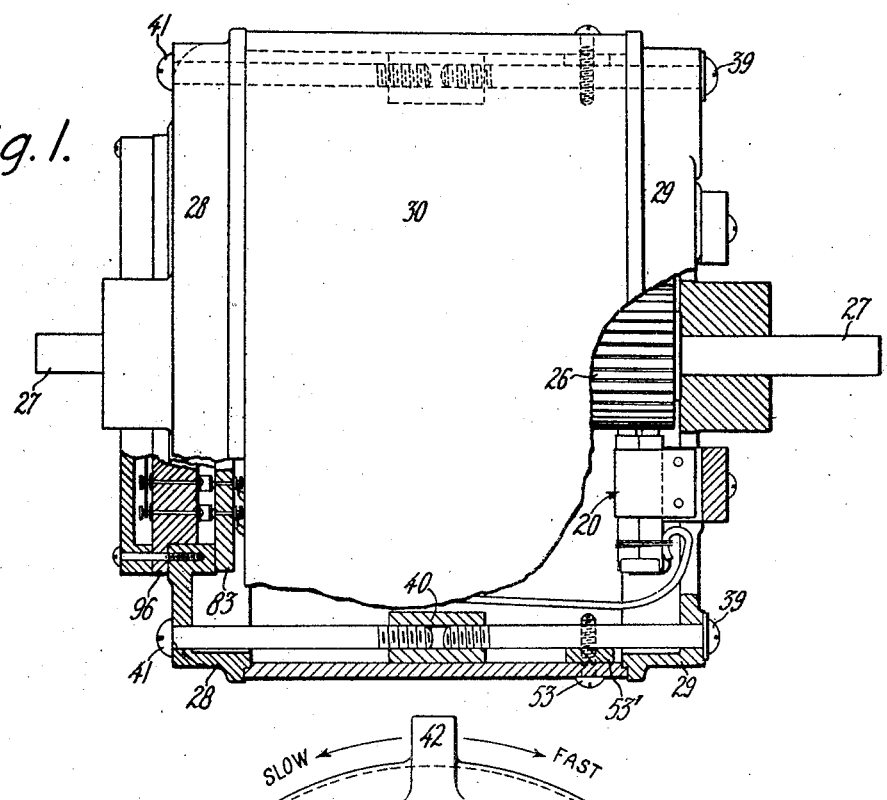
Figure 1 is a plan view with parts broken away and parts in section illustrating a motor embodying the invention.
Figure 2:
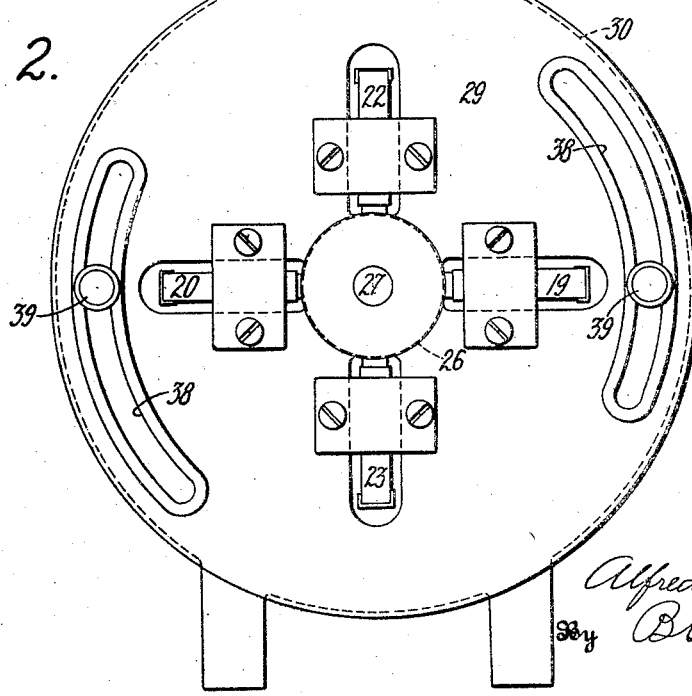
Figure 2 is an elevational view taken at the left end of the motor shown in Figure 1.

The armature has a commutator 26 and a shaft 27 which rotates in heads or end closures 28 and 29 for a casing 30. The head 29 has a pair of main brushes 19 and 20 and a pair of auxiliary brushes 22 and 23, each of which is connected to terminals correspondingly designated on a terminal plate 83.

The field includes laminations 31 of U-shape and interchangeable. Extensions or fingers 32 and 33 are provided at the ends of the arms of each lamination and are formed by jogs 35 to receive the fingers 32 and 33 of a lamination lying in the same plane so that the two laminations in a single plane interlock.

Figure 3:
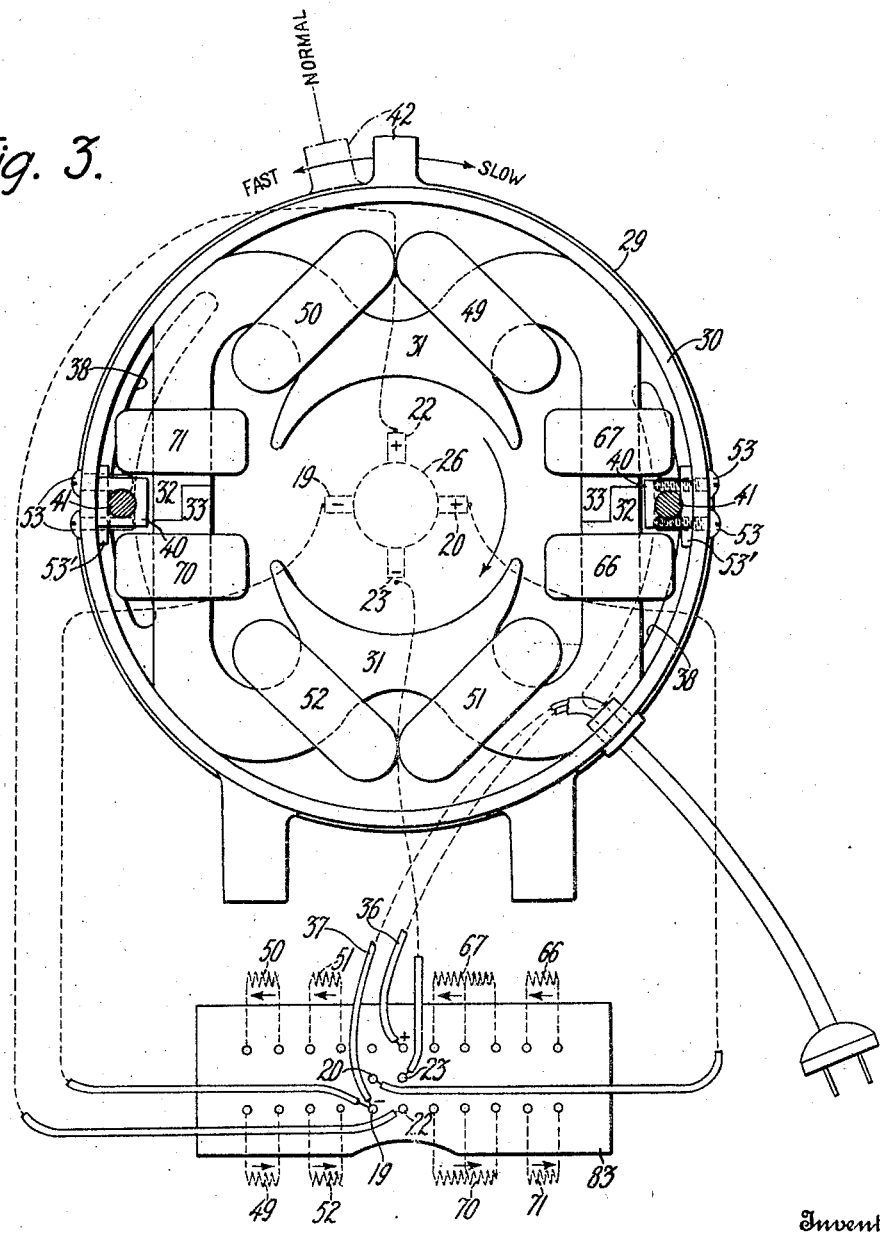
Figure 3 is a cross-sectional view of the motor shown in Figure 1, the terminal plate being illustrated for clarity as outside the motor casing.

As shown in Figure 3 alternate layers of laminations are reversed so that a finger 32 on one lamination is adjacent but slightly offset from a finger 33 of an adjacent lamination in a different plane. The interlocking relation of the laminations is such that there can be no inaccuracy in the positioning thereof.

As shown in Figure 5, each extension or finger 32, 33 of the individual laminations 31 may, when each half-core portion is built up, be viewed from the sides of the arms of said half-portions. When the half-portions therefore are brought together for interdigitation of the fingers, any misalignment of the fingers, which would obstruct said interdigitation and which misalignment may be caused by springing of the fingers 32, 33 of individual laminations, may be easily perceived and may also, because all the fingers are readily accessible, be easily remedied by prying the sprung fingers back into place. It will be further noted, see Figure 5, that the recesses 35 formed by the jogs of the individual laminations are open on their sides as well as at the top, and thus may be easily cleaned of any grit or other impediments which would impair the magnetic joint. It will also be noted that each finger 32 or 33 includes in width the greatest possible portion of the arm, or, in other words, one-half the width of said arm. In U-shaped laminations having comparatively narrow arms, as in the motor herein shown, this provision for maximum width of the fingers obviates undue narrowness of said fingers.

When the field-laminations have been assembled as above, the clamping sleeve or collar 30, forming in part a casing for the motor, is forced over the outside of the laminations to hold the same securely in place in the motor, and also to retain the surfaces of the interdigitated fingers and jogs in juxtaposition under pressure, to insure good contact therebetween and reduce the resistance to the magnetic flux across the joint to a minimum.

Main coils 49, 50, 51 and 52 and auxiliary coils 66, 67, 70 and 71 are mounted on the magnet and are connected to terminals on the terminal plate 83. The main conductors 36 and 37 are also connected to terminals on the terminal plate.

A contact plate 96 has contacts thereon for engaging the terminals on the terminal plate 83 and has conductors thereon connecting various contacts. These are merely illustrative of general principles as the coil terminals and brush terminals are connectible in a large variety of ways. The connections on the contact plate are made according to the nature of the current on which the motor is used.

The plates 96 and 83 are mounted on the head 28.

Means are provided by which the head 29 may be releasably secured to the head 28.

The head 29 may have slots 38 each of which may receive a screw 39. Each screw 39 may be threaded into a block 40 which may be secured to the head 28 by a screw 41. When the screw 41 is loosened the head 29 can be moved by the operator by means of a handle 42.

The movement of the head 29 shifts the brushes 19, 20, 22 and 23 and increases or decreases the speed of the motor depending on the direction of movement of the head as will be presently explained. As shown in Figures 1, 2, and 3, 4 and 6, the casing 30 and head 29 may have appropriate markings to indicate whether the motor is in normal, fast or slow position.

Retaining screws 53 prevent displacement of the clamp-screws 39 when the head 29 is moved and may be threaded into the block 53' and thus be drawn tight in the side of the casing.

A modified form of retaining device for releasably securing the head 29 in a particular angular position is shown in Figure 6.

In this form the head 29 is movable longitudinally of the armature shaft a slight distance but the shaft is provided with stops 54 for preventing such large movement of the heads as would cause damage.

A screw 55 may be secured in a slot 56' in the head 29 and its threaded end may extend into a hollow connection 56. A similar oppositely disposed screw may be secured to the head 28. A spring 57 may be adjustably secured to the screws by means of nuts 58. The tension of the spring 57 may be overcome when the handle 42 on the head 29 is grasped by the operator and the head 29 may be readily moved angularly. Screws 59 may be extended through the wall of the casing for preventing displacement of the screw 55.

Although Figure 6 illustrates two of the devices, such as just described, for securing the head 29 for limited movement, any desired number of such devices may be used.

It will be noted that by the incorporation of the armature bearing in the shiftable brushhead, the brushes may be readily moved for angular adjustment, yet, nevertheless, there are preserved the highly desirable features of substantially enclosing the working parts of the motor journaling the armature at each of its ends.

The speed of the motor changes on A. C. due to the well known principle that if the brushes are moved against the direction of rotation, the speed of the motor will increase. In addition to this, the power also increases due to the fact that the relationship with the armature windings and connections to the field allows the motor to take more current, the power increasing directly as the current increases.

In Figure 4 arrows A, B and C indicate the direction of the armature magnetism. Arrow A indicates the direction of the armature magnetism as produced by the current used from the main line circuit. Arrow C indicates the magnetic field of the armature as produced by the induced current in the armature winding by the field magnetism. Arrow B represents the resultant magnetism from the combined magnetic force as shown by arrows A and C. It has been indicated or shown by dotted lines just how far these arrows will move in comparison with the movement of the brushes. The arrow B will not bisect the angle between arrows A and C unless the magnetic strength of arrows A and C is equal.

With the scheme of connections illustrated, the motor will operate with greater power and speed when the arrow B is a short distance in a counterclockwise direction from the position illustrated. This follows from the relation of the lines of field magnetic force to the force represented by the arrow B.

If brushes 22 and 23 were removed the force represented by arrows A and B would disappear and the motor would have less power.

When the strength of magnetism represented by arrow B is decreased arrow C is moved in a clockwise direction as B' represents a resultant. The speed of the motor is therefore decreased.

When the minimum current is induced in the armature it so happens that the brushes are adjusted for the higher speed and likewise, when the minimum current is induced in the armature and is picked up by brushes 22 and 23, the brushes are in the position as indicated, for the slowest speed.

On A. C. the shifting of the brushes increases or decreases the speed in the standard method as previously explained. But also due to the fact that the vertical brushes 22 and 23 are connected to auxiliary coils in a novel way, the motor has more power when adjusted to a higher speed, due to the fact that the motor is capable of consuming more current under such conditions, because of the relationship of the resultant armature magnetism and field magnetism. One of the principles of operation is the fact that the shifting of the armature brushes allows more or less turns of the armature winding to be caught by the field magnetic force, causing the voltage generated in such armature winding to be decreased or increased. The auxiliary brushes are connectible to auxiliary coil 70, as explained, to help or oppose the main field magnetism. The scheme of shifting the brushes is for increasing speed, and allows the motor when connected to A. C. to consume more current, and thereby allows the motor to produce more power as the speed is increased. This is the result of the arrangement and relationship of the various coils and the components of the magnetism.

Wide variations may be made within the scope of the invention, as for example, the field coils may be transposed with the auxiliary coils, and the invention may be used with other magnets than the double horseshoe type illustrated; and portions of the improvements may be used without others, as, for example, the motor altering devices or contact plates may be used only for alternating current if desired. As another example, the speed-regulating means for an alternating motor may be employed whether or not any contact plate is used.

Having thus described my invention, I claim:

1. In an electric motor, the combination of an armature, a commutator therefor, a field-structure, a casing for said field-structure, a pair of heads for the ends of said casing and in which opposite ends of said armature are journaled, one of said heads being mounted for angular movement by an operator, and a pair of brushes for said commutator mounted on said one head for movement therewith to alter the relation of said armature and said field-structure.

2. An electric motor having an armature, a field-structure, a casing for said field-structure, a pair of heads for said casing in which opposite ends of said armature are journaled, one of said heads being mounted for angular movement, a handle on said head for manual movement thereof, a commutator, and commutator brushes mounted on said movable head for movement therewith.

3. An electric motor having an armature, a field-structure, a casing for said field-structure, a pair of heads for said casing in which opposite ends of said armature are journaled, one of said heads being mounted for movement, and having an arcuate slot therein, a retaining element projecting through said slot, for securing the movable head to the other head, but permitting limited angular movement of said movable head, a commutator, and brushes mounted on said movable head for movement therewith.

4. An electric motor having an armature, a field-structure, a casing, a pair of heads for the ends of said casing, one of said heads being mounted for angular movement, an armature shaft supported between and therefore journaled in said heads, a stop on said shaft for limiting the longitudinal movement of said movable head, a commutator, and brushes mounted on said movable head for angular movement therewith.

5. An annular laminated field-magnet core constructed of U-shaped laminated half-portions over the arms of which prewound field-coils may be threaded and said half-portions then joined to form the complete annulus by abutment and interlocking of the ends of said arms, each arm of each U-shaped lamination having at its end a finger formed by, and thus adjoining, a jog at said end, the fingers on the arms of one lamination being on the same side of the adjacent jogs forming said fingers, so that by reversing one U-shaped lamination in respect to the other, the fingers of one lamination will fit into the jogs of the other lamination, to thereby effect interdigitation of said fingers and uniformity of the laminations, the U-shaped laminations of each half-core portion being also alternatingly reversed, so that in each built-up half-core portion there are formed at the end of each arm thereof two rows of staggered fingers, the fingers of each row being interspaced with the jogs forming the fingers of the other row, said fingers of the two rows of each arm being thus further interdigitated with the fingers of the abutting arm of the opposite half-core portion which is similarly built up, the latter interdigitation interlocking the half-core portions against relative axial and lateral displacement, and the interdigitation throughout conducing to a good magnetic joint, and core-retaining means forcing said built-up half-core portions together from substantially diametrically opposite sides.

6. An adjustable-brush electric motor having a field-structure, an armature, a commutator, framework including a fixed bearing in which one end of said armature is journaled, commutator-brushes, and a bodily-adjustable brush-carrying head in which is incorporated a bearing for the other end of said armature, said framework including a seat and securing means for said brush-head and its armature-bearing arranged to permit angular adjustment of said brush-head and therefore of said brushes around the armature-axis while at the same time preserving the alignment of the armature-bearings at all adjustments, said incorporation of the one armature-bearing with the shiftable brush-head conducing to simplicity of the motor-structure.

7. A casing, for substantially enclosing an adjustable-brush electric motor, constructed to permit angular adjustment of the brushes around the armature-axis, said motor having a field-structure, armature and commutator, said casing including a sleeve surrounding said field-structure and closed at one end by a fixed head which includes a bearing for one end of said armature, a movable head seated on the other end of said sleeve for rotation around the armature-axis and including a bearing for the other end of said armature, brushes mounted on said movable head for rotation therewith, and means for securing the movable head in any of its adjusted positions, the seating of said movable head on said sleeve being arranged to preserve the alignment of the armature-bearings in the opposite heads at all adjustments of the movable head.

8. In an adjustable-brush electric motor having a field-structure, armature, commutator, and brushes for said commutator, the combination of an armature bearing member including supports for said brushes, and means for supporting said bearing member arranged to permit angular adjustment of said bearing, and hence of said brushes relatively to the field-structure.

9. In an electric motor, an annular field-core structure, formed in radial sections by a plurality of similar laminated field-core members joined substantially at a plane through the axis of the core, each of said members of the core having end portions to engage with similar end portions on contiguous sections when the sections are assembled together, each end portion including a finger and a jog radially disposed therein, the finger and the jog on one end portion of a member alternating with those at the other end portion, and a plurality of alternate fingers and jogs longitudinally disposed therein, said fingers and jogs being perpendicular to said plane and effective to interdigitate with similar fingers and jogs, and similarly positioned, in the sections connected therewith.

ALFRED E. OSWALD.